358-84. XR 2,917,622 SR OSS REFERENCE SEARCH ROOM

325/311

Dec. 15, 1959 N. B. WALES, JR., ET AL 2,917,622

DISCRIMINATING COUNTER FOR RECEIVER RADIATIONS

Filed March 4, 1958 2 Sheets-Sheet 1

TX 5025

INVENTORS

Nathaniel B. Wales Jr.

Charles B. [signature]

DISCRIMINATING COUNTER FOR RECEIVER RADIATIONS

Filed March 4, 1958 2 Sheets-Sheet 2

INVENTORS

Nathaniel B. Wales Jr.
Charles B. ...

United States Patent Office 2,917,622

Patented Dec. 15, 1959

2,917,622

DISCRIMINATING COUNTER FOR RECEIVER RADIATIONS

Nathaniel B. Wales, Jr., Sharon, Conn., and Charles B. Grady, Jr., West Orange, N.J., assignors to I.A.M., Inc., New York, N.Y., a corporation of New York Application March 4, 1958, Serial No. 719,080

5 Claims. (Cl. 250—2)

This invention relates to the art of radio and television audience surveying, and in particular to an equipment system which permits accurate comparisons of the relative audiences in a given area tuned in to a given plurality of broadcasting stations.

It is known that standardization in the manufacture of radio and television receiving equipments has resulted in the fact that at present more than 90% of all entertainment receiving equipments are of the superheterodyne type, and, in addition, use the same frequency of intermediate frequency amplification for each class of service (i.e., radio or television). This means that for more than 90% of such radio and television receivers there is a one to one correspondence between the nominal beat-frequency oscillator frequency of such receivers and the identity of the stations to which they are tuned.

It is also known that all such receiver designs, even after complying with the federal and industry-imposed requirements, permit and in fact do re-radiate substantial energy at the frequency of their local beat-frequency oscillators.

These two facts suggest that it would be possible to compare the statistical ratios between the audiences in a given area which are tuned in to a given group of transmitting stations, by counting the number of local beat-frequency oscillator re-radiations which could be picked up by an observing receiver of given sensitivity, centrally located in this area, for each nominal re-radiation frequency corresponding to this group of transmitting stations, and by then forming the ratios of these counts.

Evidently, if all such re-radiations were of exactly the same frequency it would not be possible to distinguish between them, and no means would be available to perform such a count. However, there are two factors which guarantee that there will be a definite statistical spread of the frequencies of receiver re-radiation. These are:

(*a*) Variations in the factory setting or service adjustment of the intermediate frequencies from receiver to receiver, and (*b*) Variations in the individual manual tuning from receiver to receiver.

In comparison to factor *b*, factor *a* is small due to standard manufacturing techniques and to the nearly universal use of precision service oscillator test equipment. Factor *b*, however, is very substantial in spreading the frequencies of receiver re-radiations. This is because the only criteria available to an individual manually tuning a receiver are the definition of the picture and (or) the degradation of the sound received and because the average untrained operator of an entertainment receiver cannot discriminate within relatively wide limits as to when these criteria indicate optimum reception. Furthermore, due to the shape of a typical band pass amplifier curve for attenuation vs. frequency, there will be a much more rapid deterioration of signal on the higher frequency side of the nominal intermediate frequency than on the lower frequency side. Consequently, the density of receiver re-radiation with respect to frequency will be asymmetrically centered about nominal re-radiation frequency with the more gradual diminution of density occurring as the frequency diminishes from the nominal value.

Since the shape of this re-radiation density distribution curve for each transmitting station received will be identical, it follows that the number of re-radiations counted within a fixed frequency interval displaced toward the lower frequency side from the nominal re-radiation frequency for a given transmitting station will bear a numerical ratio to the corresponding number counted for a second transmitting station, substantially equal to the ratio of the relative audiences for these two stations within the observed area.

The choice of the foregoing fixed displacement and interval will be determined by the frequency resolving ability of the observing equipment, and the ability to obtain a statistically significant number of counts, respectively.

However, the theoretical ability to perform such relative counts and form such audience ratios is seriously hindered by the presence near the nominal re-radiation frequencies of both amplitude and frequency modulated signals generated by other communication services such as aircraft, ship-to-shore, taxi, mobile telephone, F.M., omni-range, or amateur transmitters. These adjacent signals thus present serious difficulties as a source of error in such comparative audience counts.

The present invention overcomes these difficulties by providing a novel system capable of automatically and rapidly performing accurate counts of the unmodulated receiver re-radiations over a predetermined frequency interval while rejecting and discriminating against any signals which are amplitude or frequency modulated.

In order to accomplish this automatic discriminating count, our invention teaches the use of a voltage controlled oscillator whose controlling voltage comprises the algebraic sum of a voltage-time-ramp-function and the feed back signal of a limited range phase locking servo loop. This voltage controlled oscillator is arranged to be the sweep tuning means of a narrow pass band superheterodyne receiver for the foregoing re-radiated audience signals. Consequently, the ramp generator will cause the receiving frequency to vary until a signal is received. As soon as a signal is received, the above phase locking servo loop will attempt to over-ride the ramp sweeping function so as to keep the receiver tuned to the incoming signal. However, due to the fact that the range of the phase sensitive servo loop is limited, when the feed back signal reaches this limit, and can no longer keep the signal in tune, the continually increasing ramp voltage will prevail, and the input voltage to the voltage controlled oscillator will very rapidly revert back to the ramp function voltage to resume the search for another signal. The result of the foregoing interaction is to produce a "broken ramp" form of voltage input to the voltage controlled oscillator. These discontinuities are then differentiated and rectified to produce a single voltage pulse for each signal recognized by the self-tuning servo loop.

According to our invention these discrete signal-recognition pulses are then passed through a normally open gate into a counter for registering the number of audience re-radiations encountered during the sweep of the predetermined frequency interval. This gate may be rendered closed by the presence of an output signal from either of two detectors which are connected to monitor the same signal which actuates the said phase locking servo loop. One of these detectors is designed to yield an output signal only for an amplitude modulation of the received signal, while the other is designed to respond only to the presence of frequency modulation in the received signal. Consequently, the foregoing gate will be closed in the presence of either an AM or FM signal at the time that the servo loop relinquishes control of the oscillator, and the resultant signal-recognition pulse from the broken ramp function will be excluded from the count of unmodulated audience re-radiation signals.

It will be recognized as an important feature of our invention that the signal recognizing means which we disclose is of such a nature as to permit the necessarily finite time of discriminating signal build-up to take place and to close the discriminating gate before the signal recognizing pulse occurs at the end of the incoming signal encounter.

In addition it will be recognized that this finite time of signal examination afforded by the foregoing ramp function permits an intermittently modulated signal to be excluded along with the continuously modulated signals.

An object of our invention is to provide an equipment capable of accurately determining the relative population of radio and television audiences in a given area.

A second object is to provide an automatic counter for unmodulated receiver re-radiations over a predetermined frequency interval, which will discriminate against and reject any amplitude or frequency modulated signals.

Other objects are implicit in the accompanying specifications and claims.

Figure 1:
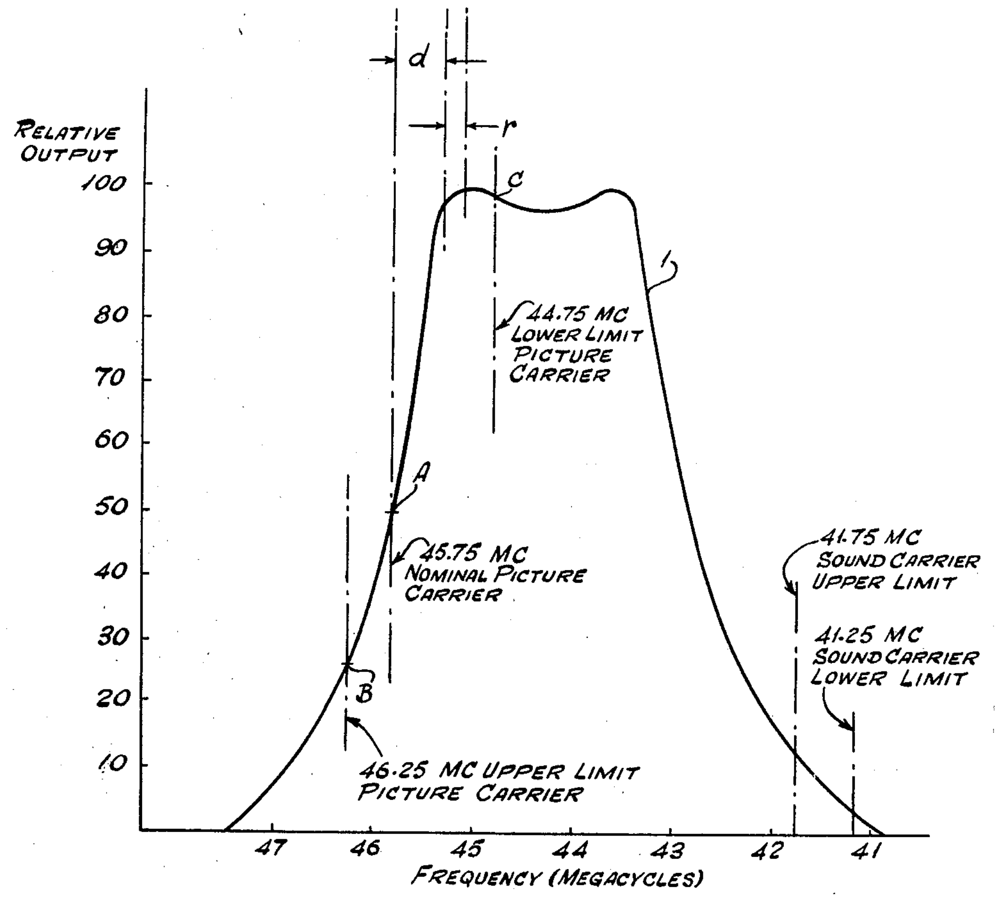
Fig. 1 is a graph of the relative output vs. frequency of input to a typical band pass intermediate frequency amplifier as employed in the majority of television or radio receivers.

In Fig. 1 it may be seen that the picture carrier component of the nominal television intermediate frequency of 45.75 megacycles falls at the mid point of the high frequency rise side of the typical band bass curve 1 for a correctly tuned intermediate frequency amplifier. Consequently, if the receiver's oscillator were correctly tuned, the picture carrier would also fall at 45.75 mc. (point A) and optimum reception would result. If the receiver's oscillator is tuned .5 mc. higher so that the picture carrier falls at 46.25 mc. (point B), the result will be poor synchronization, intermittent pattern, and loss of sound quality. On the other hand, if the receiver oscillator is tuned 1.0 mc. lower so that the picture carrier falls at 44.75 mc. (point C), the result will be bad loss of detail together with a sound level down by the order of 12 db. It is thus evident that there is more tolerance for an acceptable picture between A and C on the low frequency side of the nominal carrier frequency than there is between A and B on the high frequency side of A.

For each transmitting station, depending on its carrier frequency, there will be frequencies of re-radiation (based on the common use of nominal 45.75 mc. intermediate frequencies) corresponding to the upper picture carrier frequency limit, point B, and to the lower picture carrier limit, point C, and also to the nominal picture carrier frequency, point A. These frequencies are listed below for twelve television channels:

*Oscillator frequency (mc.) for 45.75 mc. IF*

| Channel | Nominal (A) | Upper Limit (B) | Lower Limit (C) |
|---|---|---|---|
| 13 | 257 | 257.5 | 256 |
| 12 | 251 | 251.5 | 250 |
| 11 | 245 | 245.5 | 244 |
| 10 | 239 | 239.5 | 238 |
| 9 | 233 | 233.5 | 232 |
| 8 | 227 | 227.5 | 226 |
| 7 | 221 | 221.5 | 220 |
| 6 | 129 | 129.5 | 128 |
| 5 | 123 | 123.5 | 122 |
| 4 | 113 | 113.5 | 112 |
| 3 | 107 | 107.5 | 106 |
| 2 | 101 | 101.5 | 100 |

According to the use of our invention, it is therefore desirable to select a frequency interval of re-radiations to scan for each channel which lies between the points corresponding to points A and C of Fig. 1 on the lower-frequency higher-tolerance side of the nominal re-radiation frequency. This interval is designated *r* in Fig. 1 and is displaced downward in frequency by the frequency difference *d* from the nominal point A. Once selected, the values of *d* and *r* will be applied identically to each channel in order to generate the comparative count.

It is to be expected in a given highly populated area that the density of receivable re-radiations near the nominal oscillator frequencies will be so high as to be incapable of resolution by existing equipment. Consequently, the frequency displacement *d* should be chosen so that the average separation of observable re-radiations is well within the resolving power of the given equipment. In addition, the span of the frequency interval *r* should be chosen to be large enough to produce statistically significant numbers of re-radiation counts so that the ratios of the counts made for the several channels will accurately reflect the relative audiences between them.

Figure 2:
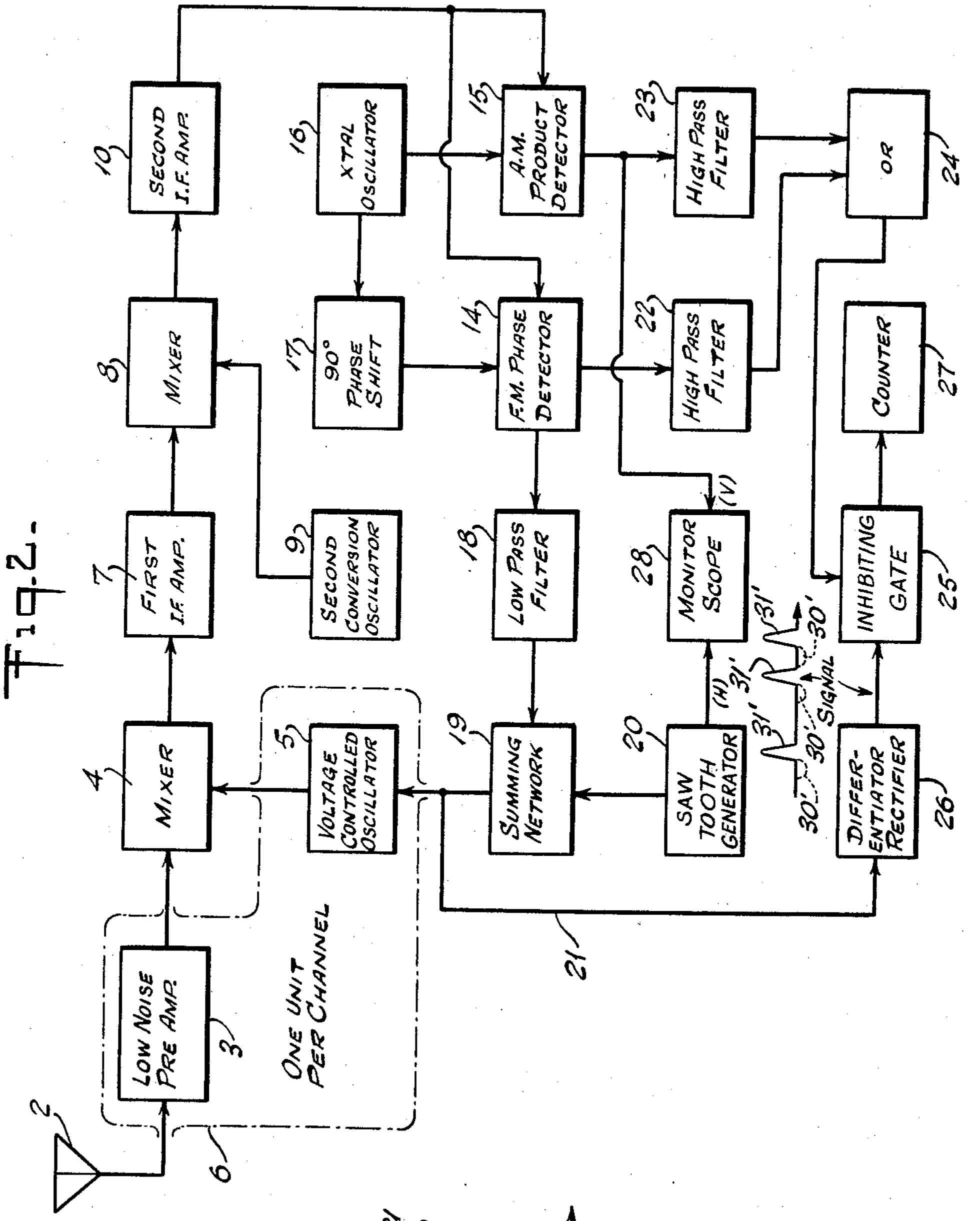
Fig. 2 is a schematic diagram of the functional connections between the elements of the preferred form of our invention.

Referring now to the schematic diagram of Fig. 2 the output of a high gain omni-azimuthal antenna 2, preferably located at an elevation in the center of the area to be surveyed, is fed into a low noise preamplifier 3 designed to cover one particular re-radiation channel corresponding to frequency interval *r*. It is to be noted that the foregoing use of an antenna having equal response in azimuth is desirable for general area type surveys. However, when it is desired to compare different suburban components of an urban audience, it is evident that such spot comparison can be made by substituting a highly directional antenna for this purpose. This amplified signal together with the output of the voltage controlled oscillator 5 are fed into the mixer stage 4 where they form a beat frequency signal which is in turn fed into first intermediate frequency amplifier 7. Voltage controlled oscillator 5 is designed to have a sweep range also corresponding to the frequency interval *r*, and it forms with preamplifier 3 an electrical channel package 6 for the counting of the re-radiations of one specific channel or station.

There will be one such package 6 for each station which is desired to be compared, and these channel units 6 may be arranged to be plugged-in or switched for changing channels, because the rest of the equipment of Fig. 1 remains the same for all channels.

Following first IF amplifier 7 is an additional stage of frequency conversion which is employed to improve the image rejection characteristics of the equipment. This comprises second mixer 8, second oscillator 9, and second IF amplifier 10. For television surveying, the frequency of first IF amplifier 7 may be on the order of 10 mc., while the pass band of second IF amplifier 10 might be 800 cycles per second wide at a center frequency of 465 kc.

The output of IF amplifier 10 is fed into two multiplier type detectors 14 and 15. Detector 14 is a phase detector which compares the phase of the input signal from amplifier 10 to the phase of the stable crystal controlled local oscillator 16 after it has passed through the 90° phase shift network 17. The output of phase comparing detector 14 is a signal which is a function of the difference between the fixed frequencies delivered through the pass band of amplifier 10. Consequently, the high frequency components of the output of detector 14 will comprise information as to the frequency modulation of the instantaneous signal. This signal information is passed through high-pass filter 22 to close normally open gate 25 through the logical "OR" element 24.

On the other hand, the low frequency component of the output of detector 14 represents the tuning error signal which is therefore passed through the low pass filter 18 to be impressed through summing network 19 as a controlling factor on the voltage controlled oscillator 5. Consequently, the elements 5, 4, 7, 8, 9, 10, 14, 16, 17, 18 and 19 form a phase locked servo loop which tends to control the frequency of oscillator 5 so that the incoming signal will emerge from IF amplifier 10 at the same frequency as the fixed frequency oscillator 16. By suitable choice of operating parameters, the voltage change output per frequency difference input for phase detector 14 in relation to the voltage slope of the ramp generator 20 may be chosen so that this servo loop has only a small frequency interval of control over oscillator 5. In other words, this servo system is a limited range phase locked loop.

It is to be noted that the low pass filter 18, because of its long time constant, will exert a "fly wheel" effect on the servo system giving it great stability and tenaciousness in locking on to any unmodulated signal.

Figure 3:
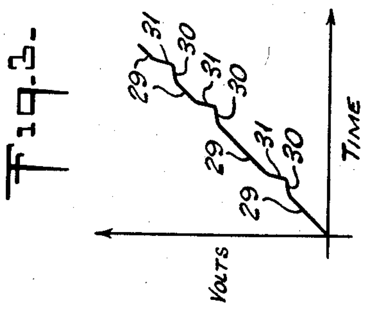
Fig. 3 is the graph of voltage vs. time showing the broken ramp function which controls the voltage controlled oscillator of our invention.

In addition to the control of the frequency of oscillator 5 by the feedback signal from detector 14, a ramp function generator 20 is provided to superimpose a linear time-voltage ramp on to the said servo signal feedback voltage by means of the adding network 19 so that the control voltage of voltage controlled oscillator 5 comprises the algebraic sum of this ramp function and the limited range feedback voltage. The result of these superimposed control signals is shown in Fig. 3 as a broken ramp function which is the final control voltage effective on the input to voltage controlled oscillator 5 in the presence of signals within the sweep frequency range *r* at the antenna 2. In Fig. 3 the ramp portions 29 are due to the ramp generator 20 while the constant voltage plateaus 30 are due to the overriding influence of the phase locked servo feed back voltages delivered by low pass filter 18 under the control of error signals derivative from detector 14. The steep rise portions 31 of the control voltage curve of Fig. 3 occur when the continually rising ramp voltage reaches the limit of the said feedback voltage range and overwhelms the phase locking ability of the servo loop. This sudden return 31 to the frequency sweeping ramp function is the signal which our invention teaches for the criterion for an input signal.

Signal 31 is utilized by passing the broken ramp voltage via lead 21 into a differentiator-rectifier 26 where a single pulse is generated for each signal producing a sudden rise characteristic 31 at the input of the voltage controlled oscillator 5. The output pulses from differentiator 26 are then passed through normally open electronic gate 25 into the counter 27 which may be either electronic or electromechanical, and which is preferably resettable for convenience in making repeated counts on the same or a different survey channel. Gate 25 is designed to have a quick-close slow-open characteristic to aid in discriminating against intermittently modulated signals. The closing of gate 25 is effected by the electrical "OR" element 25 in response to an output signal from either of the high pass filters 22 or 23. As before described, signals delivered by filter 22 represent the presence of frequency modulation in the signals delivered by amplifier 10. On the other hand, since the output of IF amplifier 10 is also impressed on the product detector 15 where it combines without phase shift with the fixed oscillator 16, this output from detector 15 will represent the presence of amplitude modulation in the signal delivered by amplifier 10. Due to the fact that an originally unmodulated signal at the antenna 2 will have a systematic slow amplitude modulation superimposed on it by the sweeping operation of ramp generator 20, it is desirable to pass the amplitude modulation indicating signal from detector 15 through the high pass filter 23 before impressing it on gate 25 as a control voltage. In this way only truly amplitude or frequency modulated signals will be rejected by gate 25.

For assistance in adjusting the equipment, a monitoring oscilloscope 28 is provided and connected to have its horizontal sweep controlled by ramp generator 20, while its vertical deflection is controlled by the unfiltered output of amplitude detector 15.

The operation of our invention consists in the registering of the count on counter 27 corresponding to one sweep of ramp generator 20 for the connection of a channel package 6 for each channel which it is desired to compare the relative audiences. The ratio of these counts will then represent the audience ratios for the corresponding stations.

It is to be noted that this specification has described our invention in terms of elements such as antennas, low noise amplifiers, voltage controlled oscillators, mixers, intermediate frequency amplifiers, oscillators, detectors, filters, gates, counters, ramp generators, adding networks, and oscilloscopes all of which are individually well known to those skilled in the current electronic art.

An example of this current electronic art describing some of the elements of our invention including a phase locked servo loop will be found in External Publication No. 376 by Richter, Samson and Stevens of the Jet Propulsion Laboratories of the California Institute of Technology.

What we claim is:

1. In an apparatus for counting unmodulated radio frequency radiations, the combination comprising a superheterodyne type receiver for radio frequency radiations, a first oscillator for selecting the frequency of signal received by said receiver, an intermediate frequency amplifier for amplifying the signals selected by said first oscillator, voltage responsive means for controlling the frequency of said first oscillator, frequency modulation detector means for producing a first voltage which is a function of the frequency modulated components of the signals amplified by said intermediate frequency amplifier, ramp generator means for producing a second voltage which is sweep function of time, network means for generating a third voltage which is a function of the algebraic sum of said first voltage and said second voltage, circuit means to apply said third voltage to said voltage responsive means for controlling the frequency of said first oscillator, differentiator means for generating pulses in response to high rates of change of a selected polarity in said third voltage, a normally open gate, a pulse counter, means to apply said differentiator generated pulses to said pulse counter through said gate, amplitude modulation detector means for producing a fourth voltage which is a function of the amplitude modulated components of the signals amplified by said intermediate frequency amplifier, and means to close said gate in response to predetermined levels of either said first voltage or said fourth voltage.

2. An apparatus according to claim 1 including a low frequency pass filter connected between said frequency modulation detector means and said network means whereby said third voltage is a function of the sum of the low frequency components of said first voltage and said second ramp voltage.

3. An apparatus according to claim 1 including a high frequency pass filter connected between said amplitude modulation detector means and said gate closing means.

4. An apparatus according to claim 1 including a high frequency pass filter connected between said frequency modulated detector means and said gate closing means.

5. An apparatus according to claim 1 in which said frequency modulation detector comprises a fixed frequency oscillator coupled to means for generating a voltage which is a function of the phase difference between the phase said fixed frequency oscillator and the phase of the signals amplified by said intermediate frequency amplifier.

References Cited in the file of this patent

UNITED STATES PATENTS

| | | |
|---|---|---|
| 2,552,585 | Rahmel | May 15, 1951 |
| 2,678,382 | Horn et al. | May 11, 1954 |